US012720065B2

(12) United States Patent
Barker et al.

(10) Patent No.: US 12,720,065 B2
(45) Date of Patent: Aug. 25, 2026

(54) LOCAL MOTION EXTENSION IN VIDEO CODING

(71) Applicant: Google LLC, Mountain View, CA (US)

(72) Inventors: Rachel Barker, Cambridge (GB); Debargha Mukherjee, Cupertino, CA (US); Jianle Chen, San Diego, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/864,188

(22) PCT Filed: May 11, 2022

(86) PCT No.: PCT/US2022/028851
§ 371 (c)(1),
(2) Date: Nov. 8, 2024

(87) PCT Pub. No.: WO2023/219616
PCT Pub. Date: Nov. 16, 2023

(65) Prior Publication Data
US 2025/0301147 A1 Sep. 25, 2025

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/159* (2014.11); *H04N 19/176* (2014.11)

(58) Field of Classification Search
CPC .. H04N 19/137; H04N 19/105; H04N 19/159; H04N 19/176
(Continued)

(56) References Cited

U.S. PATENT DOCUMENTS 9,367,928 B2 * 6/2016 de Almeida Barreto .................... G06T 7/246
12,363,282 B2 * 7/2025 Zhao .................... H04N 19/105
(Continued)

FOREIGN PATENT DOCUMENTS

WO WO-2024167517 A1 * 8/2024 ............ H04N 19/70

OTHER PUBLICATIONS

International Search Report and Written Opinion of International Application No. PCTUS2022/028851, dated Jan. 5, 2023, 16 pgs.

*Primary Examiner* — Justin W Rider
(74) *Attorney, Agent, or Firm* — Young Basile Hanlon & MacFarlane, P.C.

(57) ABSTRACT

A warp model is determined for a block to be coded by using local motion extension. Motion for an adjacent block is extended locally into the block to determine motion for predicting the block. A motion model used for inter-prediction of an adjacent block that shares at least a portion of a boundary with a current block to be predicted is determined. The motion model is a first translational motion vector or a first warp model. A second translational motion vector for inter-prediction of the current block is determined. A second warp model for the inter-prediction of the current block is determined using the motion model and the second translational motion vector. An inter-prediction process for the current block is performed using the second warp model. For example, the interprediction process may include determining a prediction block for encoding or decoding the current block.

20 Claims, 6 Drawing Sheets

(51) Int. Cl.
*H04N 19/159* (2014.01)
*H04N 19/176* (2014.01)

(58) Field of Classification Search
USPC ........................................................ 375/240.2
See application file for complete search history.

(56) References Cited

U.S. PATENT DOCUMENTS

| | | | | |
|---|---|---|---|---|
| 2009/0257684 | A1* | 10/2009 | Liu | G06T 3/4076 382/299 |
| 2013/0064472 | A1* | 3/2013 | Zhang | G06T 3/4053 382/294 |
| 2017/0332095 | A1 | 11/2017 | Zou et al. | |
| 2019/0110063 | A1 | 4/2019 | Mukherjee et al. | |

* cited by examiner

LOCAL MOTION EXTENSION IN VIDEO CODING

BACKGROUND

Digital video streams may represent video using a sequence of frames or still images. Digital video can be used for various applications including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

One technique for compression uses a reference frame to generate a prediction block corresponding to a current block to be encoded. Differences between the prediction block and the current block can be encoded, instead of the values of the current block themselves, to reduce the amount of data encoded.

SUMMARY

This disclosure relates generally to encoding and decoding video data using local motion extension and more particularly to using local motion extension from a block adjacent to a current block to produce a warp model for inter-prediction of the current block.

An aspect of the disclosure is a method that includes determining a motion model used for inter-prediction of an adjacent block that shares at least a portion of a boundary with a current block to be predicted, determining a translational motion vector for inter-prediction of the current block, generating a warp model for the inter-prediction of the current block using the motion model and the translational motion vector, and performing an inter-prediction process for the current block using the warp model.

In some implementations, the motion model is one of a first translational motion vector or a first warp model. In some implementations, the warp model for the inter-prediction of the current block is a second warp model.

In some implementations, generating the second warp model includes maintaining a continuity of motion of pixels across the boundary.

In some implementations, the continuity of motion exists when per-pixel motion vectors of the adjacent block are continuous across the boundary between the adjacent block and the current block.

In some implementations, generating the second warp model includes establishing a common coordinate system for the motion model and the second translational motion vector and solving for parameters of the second warp model using the common coordinate system.

In some implementations, generating the second warp model includes solving for parameters of the second warp model using the motion model and the second translational motion vector.

In some implementations, performing an inter-prediction process for the current block includes determining a prediction block for the current block using the second warp model and a reference frame, generating a residual comprising a difference between pixels of the current block and pixels of the prediction block, and encoding the residual into an encoded bitstream.

In some implementations, performing an inter-prediction process for the current block includes determining a prediction block for the current block using the second warp model and a reference frame, decoding a residual from an encoded bitstream, and reconstructing the current block by adding pixels of the residual to pixels of the prediction block.

In some implementations, the second warp model is a six-parameter equation representing at least one of rotation, scaling, shearing, or stretching.

In some implementations, the boundary is a vertical line between the adjacent block and the current block, the vertical line has a horizontal coordinate x and multiple values for a vertical coordinate y, and generating the second warp model includes generating a first equation that equates a first coefficient of the vertical coordinate y of the motion model to a first coefficient of the vertical coordinate y of the second warp model, generating a second equation that equates a second coefficient of the vertical coordinate y of the motion model to a second coefficient of the vertical coordinate y of the second warp model, generating a third equation that equates a first coefficient of the horizontal coordinate x and a first translational parameter of the motion model to a first coefficient of the horizontal coordinate x and a first translational parameter of the second warp model, generating a fourth equation that equates a second coefficient of the horizontal coordinate x and a second translational parameter of the motion model to a second coefficient of the horizontal coordinate x and a second translational parameter of the second warp model, generating, using a defined pixel position in the current block, a fifth equation that equates a predicted horizontal pixel coordinate obtained using the second translational motion vector to a predicted horizontal pixel coordinate obtained using the second warp model, generating, using the defined pixel position in the current block, a sixth equation that equates a predicted vertical pixel coordinate obtained using the second translational motion vector to a predicted vertical pixel coordinate obtained using the second warp model, and solving the first equation, the second equation, the third equation, the fourth equation, the fifth equation, and the sixth equation to obtain the first coefficient of the vertical coordinate y of the second warp model, the second coefficient of the vertical coordinate y of the second warp model, the first coefficient of the horizontal coordinate x of the second warp model, the first translational parameter of the second warp model, the second coefficient of the horizontal coordinate x of the second warp model, and the second translational parameter of the second warp model.

In some implementations, the motion model is the first warp model and generating the second warp model includes modifying the first warp model using the second translational motion vector.

In some implementations, the motion model is the first translational motion vector and generating the second warp model includes determining a six-parameter warp model using the first translational motion vector and modifying the six-parameter warp model using the second translational motion vector.

In some implementations, a prediction mode for the current block is a compound prediction mode. The method includes determining a third translational motion vector for the inter-prediction of the current block and generating a third warp model for the inter-prediction of the current block using the motion model and the third translational motion vector. Performing the inter-prediction process for the current block includes performing the inter-prediction process using the second warp model and the third warp model.

In some implementations, a prediction mode for the current block is a compound prediction mode having a first portion of the current block predicted using intra-prediction and a second portion of the current block predicted using the second translational motion vector. Performing the inter-prediction process for the current block includes performing the inter-prediction process for only the second portion of the current block using the second warp model.

An aspect of the disclosure is an apparatus that performs any of the above methods, either alone or in combinations. For example, the apparatus can include a processor configured to perform any of the above methods.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings described below wherein like reference numerals refer to like parts throughout the several views unless otherwise noted.

DETAILED DESCRIPTION

Figure 1:
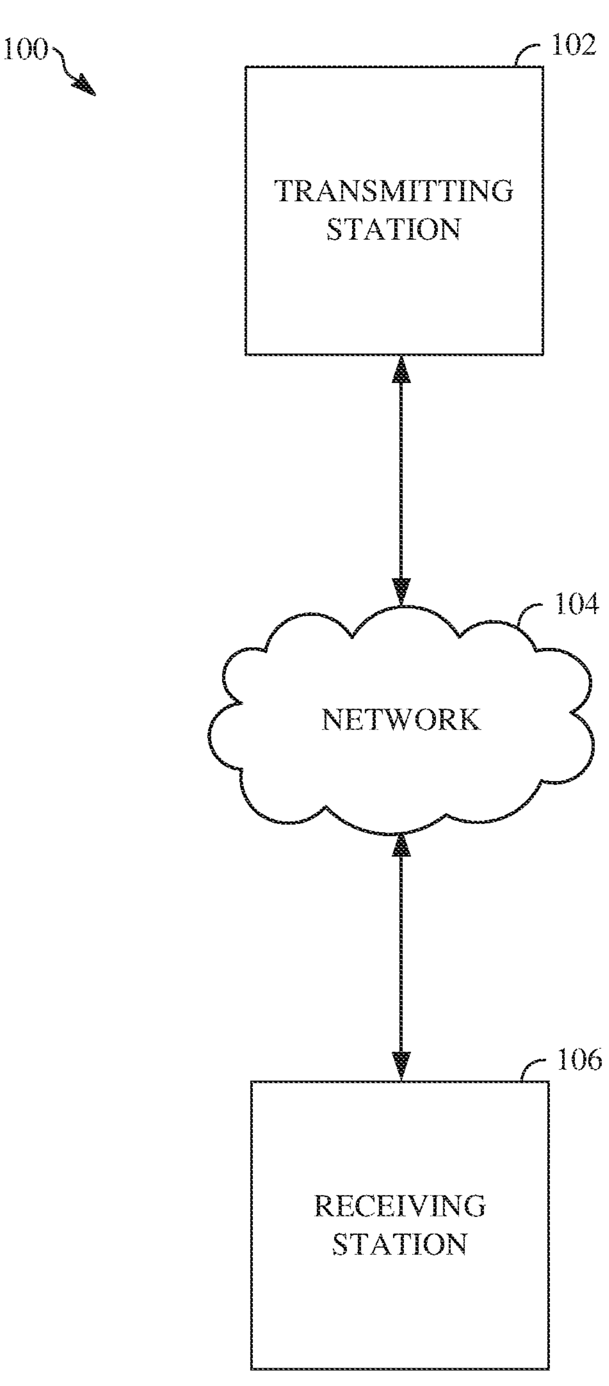
FIG. 1 is a schematic of a video encoding and decoding system.

A video stream can be compressed by a variety of techniques to reduce bandwidth required to transmit or store the video stream. A video stream can be encoded into a bitstream, which involves compression, which is then transmitted to a decoder that can decode or decompress the video stream to prepare it for viewing or further processing. Compression of the video stream often exploits spatial and temporal correlation of video signals through spatial and/or motion-compensated prediction. Motion-compensated prediction may also be referred to as inter-prediction. Inter-prediction uses one or more motion vectors to generate a block (also called a prediction block) that resembles a current block to be encoded using previously encoded and decoded pixels. By encoding the motion vector(s), and the difference between the two blocks (i.e., a residual), a decoder receiving the encoded signal can reconstruct the current block by generating the prediction block and adding pixels of the prediction block to the decoded residual block.

Each motion vector used to generate a prediction block in the inter-prediction process refers to a frame, i.e., a reference frame, other than a current frame. Reference frames can be located before or after the current frame in the sequence of the video stream and may be frames that are reconstructed before being used as a reference frame. As used herein, a forward reference frame is a frame used for forward prediction relative to the sequence, while a backward reference frame is a frame used for backward prediction relative to the sequence. One or more forward and/or backward reference frames can be used to encode or decode a block. The efficacy of a reference frame when used to encode or decode a block within a current frame can be measured based on a resulting signal-to-noise ratio or other measure of rate-distortion.

A motion model indicates motion of an object from the reference frame. In the previous examples, the motion model as represented by a motion vector indicates motion of an object from the reference frame in two dimensions-traditionally referred to as X-axis and Y-axis motion. An accurate motion model for a block improves coding efficiency, e.g., because it minimizes the residual of a block that needs to be coded (e.g., encoded and subsequently decoded). However, many objects captured by a video sequence do not exhibit 2-dimensional translational motion such that translating pixel values from a previous (i.e., reference) frame does not accurately capture the motion for inter-prediction of the block. Instead of a motion model for the block being represented by a motion vector, also referred to as a translational motion vector herein, the motion model may be represented by a warp model.

A motion model in the form of a warp model may, in addition to translational motion, apply a linear transformation (e.g., warping) such as rotation, shearing, and/or zooming, either symmetrically or asymmetrically, to pixels of a reference frame for inter-prediction. As discussed in more detail below, a warp model may be determined in different ways. For example, the warp model may be determined as a global model that is signalled at the frame level. The warp model may also be a local model determined by fitting a model against the motion of blocks near the current block.

While existing techniques can determine a motion model that efficiently inter-predicts many blocks, certain blocks may have motion that is difficult to model. For example, existing techniques may not adequately capture internal motion of relatively large blocks. Video sequences encoded at a relatively low bit rate may also result in motion models for inter-prediction that do not adequately capture the motion of individual blocks.

Techniques described herein determine a local warp model by extending a motion model of a neighboring block to a current block for inter-prediction. Details of generating such a local warp model and performing an inter-prediction process for the current block using the local warp model are described herein with initial reference to a system in which the teachings herein can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figures 2, 3:
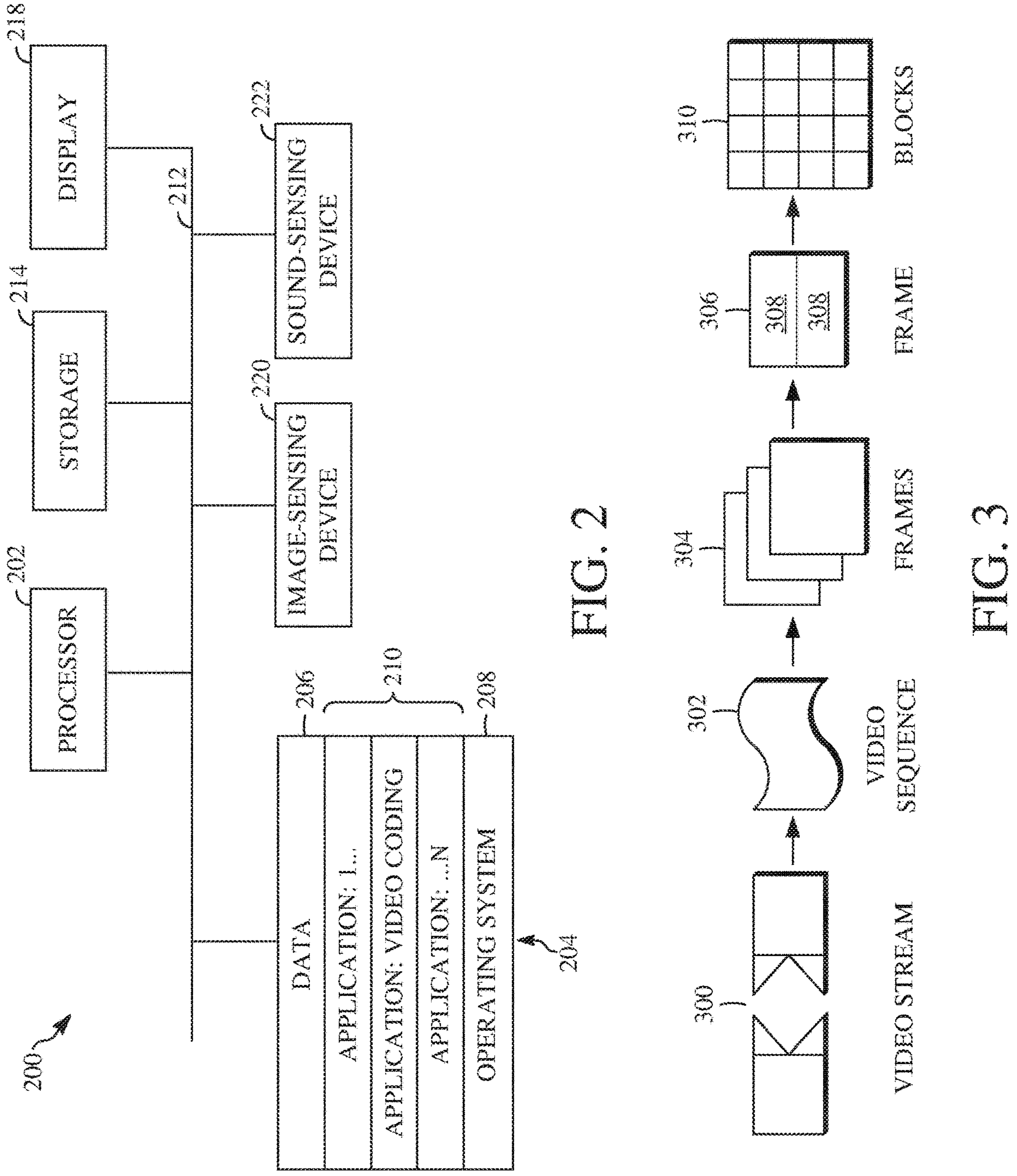
FIG. 2 is a block diagram of an example of a computing device that can implement a transmitting station or a receiving station.
FIG. 3 is a diagram of an example of a video stream to be encoded and subsequently decoded.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having a non-transitory storage medium or memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol (HTTP) based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random-access memory (RAM) device in an implementation. Any other suitable type of storage device or non-transitory storage medium can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

FIG. 3 is a diagram of an example of a video stream 300 to be encoded and subsequently decoded. The video stream 300 includes a video sequence 302. At the next level, the video sequence 302 includes several adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
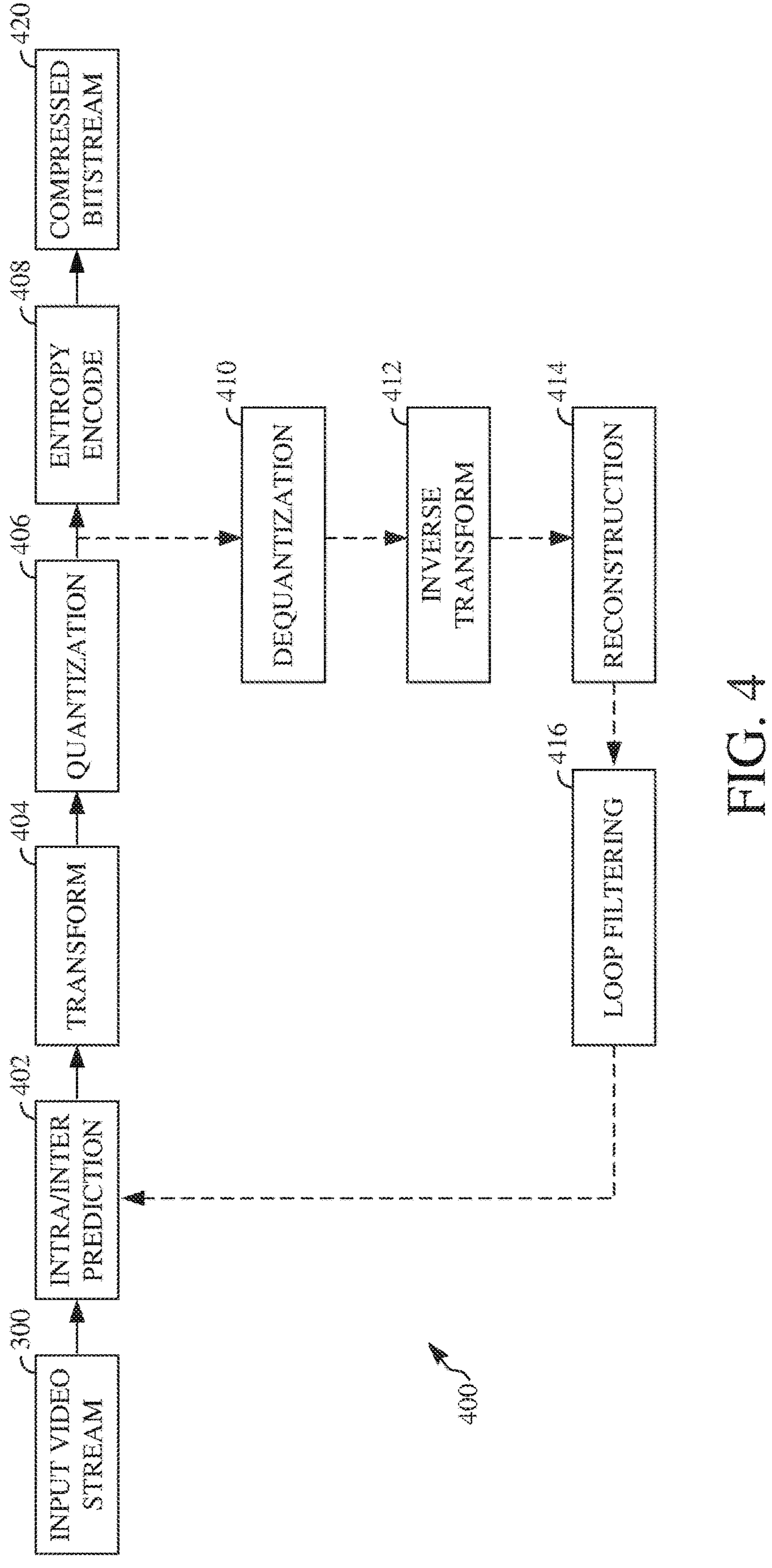
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. The encoder 400 may be a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform-based encoder can quantize the residual signal directly without the transform stage 404 for certain blocks or frames. In another implementation, an encoder can have the quantization stage 406 and the dequantization stage 410 combined in a common stage.

Figure 5:
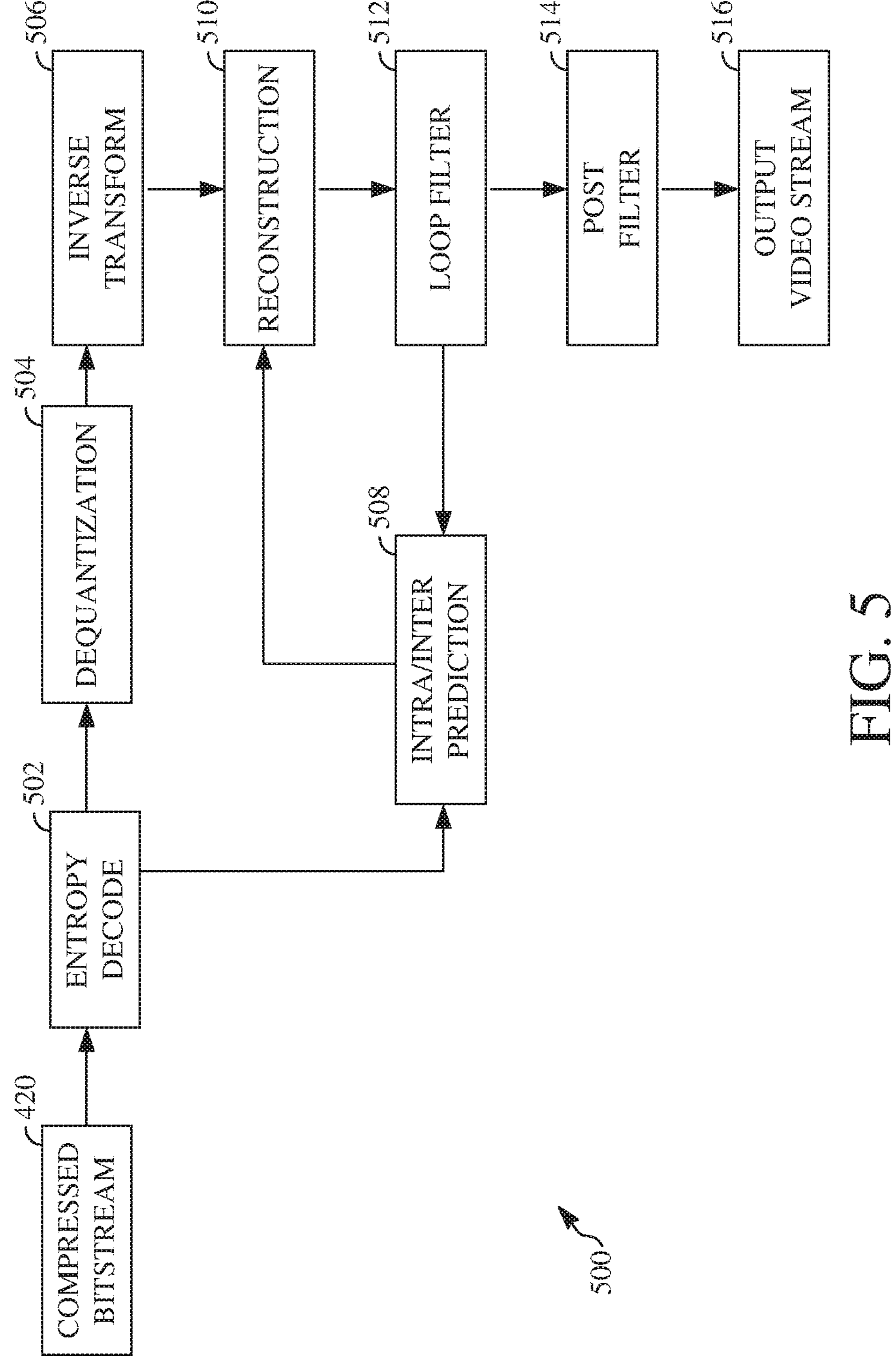
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described herein. The decoder 500 can also be implemented in hardware included in, for example, the transmitting station 102 or the receiving station 106. The decoder 500 may be a hardware decoder.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the post filtering stage 514 can be a deblocking filter that is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the post filtering stage 514.

As described briefly above, a local warp model that can be used to perform an inter-prediction process for a current block is described herein. The local warp model is generated by extending a motion model used for inter-prediction of an adjacent block. By extending the motion model, relatively smooth motion (e.g., continuity of motion) between adjacent blocks results. Further, the techniques herein are significantly less computationally intensive than known techniques for generating a warp model. Finally, the signaling of the new warp model is relatively cheap (i.e., only a few bits may be needed to indicate local motion extension is used).

Figure 6:
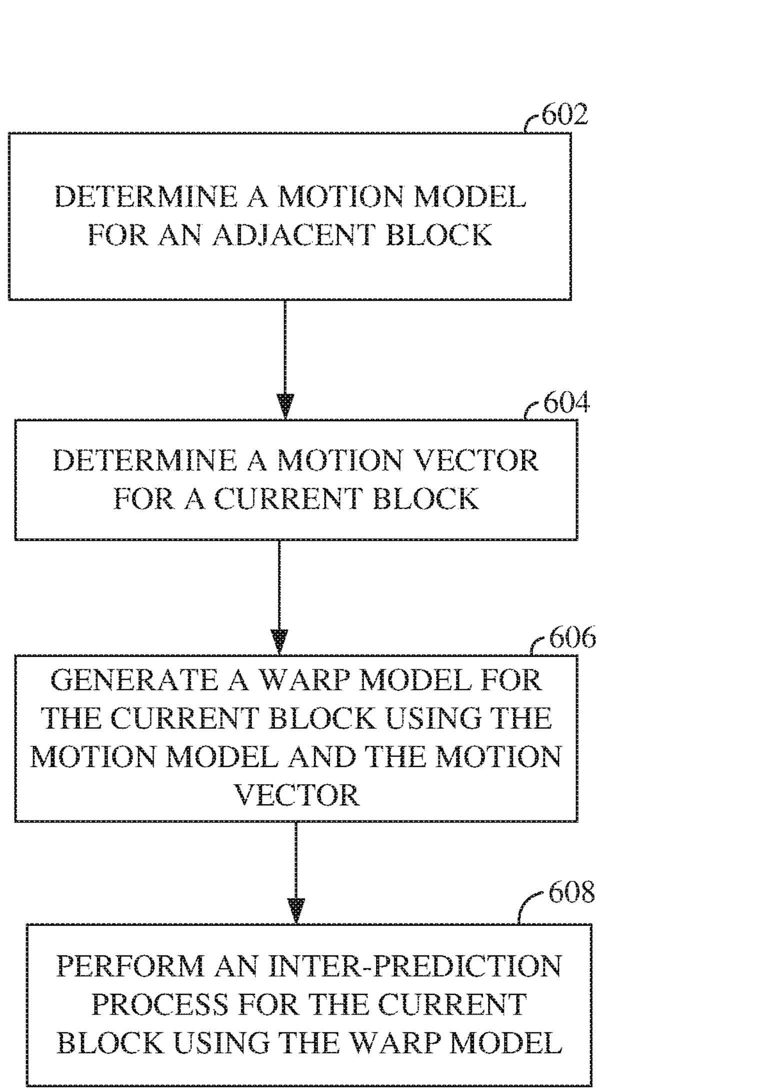
FIG. 6 is a flowchart diagram of a process for inter-predicting a current block using a warp model generated using local motion extension.
Figure 7A:
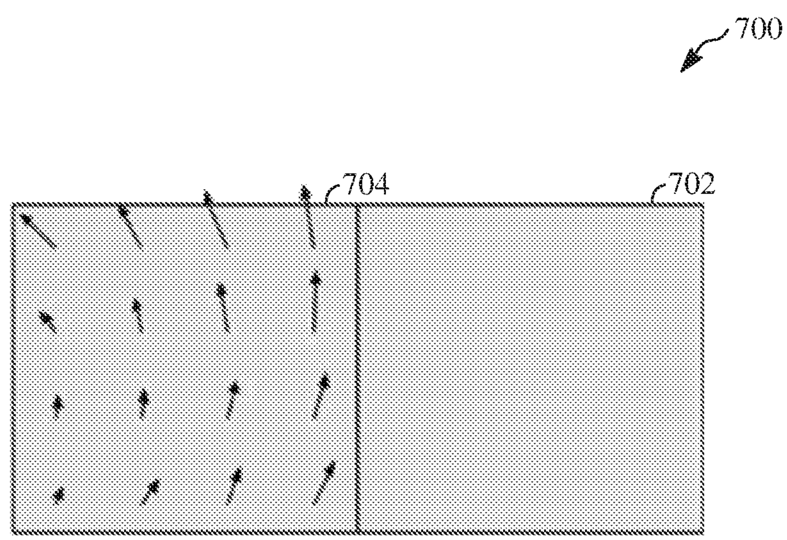
FIGS. 7A and 7B are diagrams used to explain the process of FIG. 6.
Figure 7B:
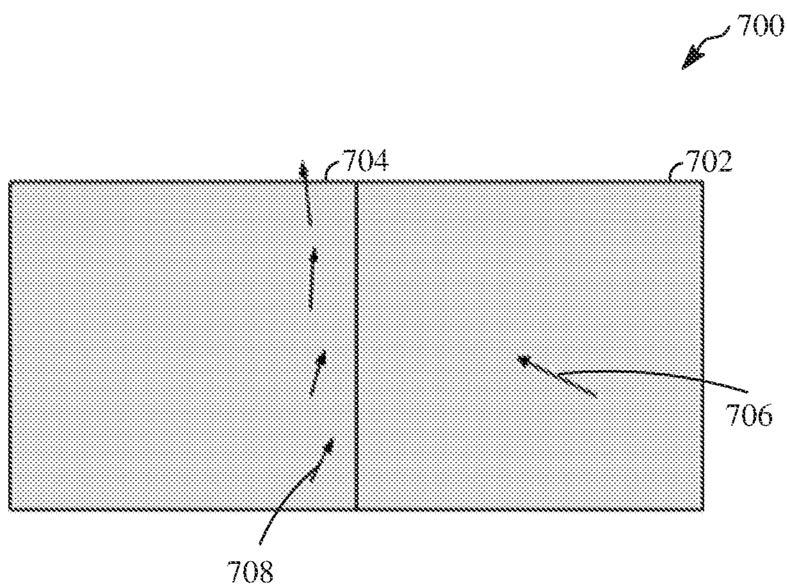

FIG. 6 is a flowchart diagram of a method or process 600 for inter-predicting a current block using a warp model generated using local motion extension. FIGS. 7A and 7B are diagrams used to explain the process 600 of FIG. 6. The process 600 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as CPU 202, may cause the computing device to perform the process 600. The process 600 may be implemented in whole or in part in the intra/inter prediction stage 402 of the encoder 400 and/or the intra/inter prediction stage 508 of the decoder 500. The process 600 can be implemented using specialized hardware or firmware. Multiple processors, memories, or both, may be used. The process 600 is first described with reference to operations of a decoder, such as the decoder 500. Thereafter, the process 600 is described with reference to operations of an encoder.

The process 600 at the decoder assumes that local motion extension is an available coding tool for the current block and is used by the current block. In practice, the decoder may determine on a per-frame basis whether local motion extension is an available coding tool by reading a flag within the header of the frame. Alternatively, the decoder may determine on a per-frame basis whether local motion extension is an available coding tool by inference based on context. For example, local motion extension would not be used with a frame that is encoded without using inter-prediction (e.g., a key frame). In some implementations, whether the tool is available is not determined at the frame level. Whether a determination is made at the frame level or not, use of local motion extension for coding the current block may be separately determined. That is, whether a block was encoded (and should be decoded) using local motion extension may be determined on a per-block basis by reading a flag encoded within the header of the block. Alternatively, whether a block uses local motion extension may be inferred from the surrounding context. For example, if one or more adjacent blocks are coded using a warp model, whether generated using existing techniques or local motion extension described herein, the current block may use local motion extension.

At operation 602, the process 600 determines a motion model (also referred to as a motion mode) for a block adjacent to a current block to be predicted for decoding. This block is hereinafter referred to as an adjacent block, and it is a block that shares at least portion of a boundary with the current block. The adjacent block is a previously encoded neighboring block that has been reconstructed. When encoding and decoding occurs in raster scan order, the adjacent block may be a block above or to the left of the current block. In other implementations or scan orders, the adjacent block may be below or to the right of the current block.

When there exists only one adjacent block, the decoder may determine the motion model for the one adjacent block as the motion model at operation 602. In some implementations where more than one adjacent block is available, which block is the adjacent block for the purpose of determining the motion model may be signaled expressly within the bitstream. Alternatively, the adjacent block may be determined from context. For example, the adjacent block may be the block sharing the largest border with the current block, may be the first block (or some other defined block) decoded that is adjacent to the current block, a block sharing a reference frame in common with the motion vector of the current block as described in more detail below, etc., or some combination thereof.

The motion model for the adjacent block determined at 602 is that used to decode the adjacent block and is obtained from, for example, header information for the adjacent block during the decoding process for the current block.

FIGS. 7A and 7B show a portion of a frame 700 that includes a current block 702 and an adjacent block 704. In this example, the current block 702 and the adjacent block 704 have the same size (e.g., the same pixel dimensions), but the adjacent block may be smaller or larger than the current block in other implementations as described below. The motion model for the adjacent block may be a translational motion vector or a warp model, also referred to by a first translational motion vector or a first warp model to distinguish it from other translational motion vectors or warp models discussed herein. That is, the terms first, second, third, etc., are used herein to distinguish an element from another element for clarity and the presence of such terms does not indicate an order or sequence of the elements, such as an order in which they are encoded, decoded, determined, identified, used, etc.

As shown by the arrows in FIG. 7A, the motion model for the adjacent block 704 is a warp model. A warp model may be referred to as a six-parameter warp model and may be represented by the following six-parameter equation.

$$\begin{pmatrix} x_{ref} \\ y_{ref} \end{pmatrix} = \begin{pmatrix} A & B \\ C & D \end{pmatrix} \begin{pmatrix} x \\ y \end{pmatrix} + \begin{pmatrix} E \\ F \end{pmatrix} \quad (1)$$

The parameters A, B, C, and D represent various transformations such as rotation, scaling, shearing, stretching, reflection, etc. They may also be referred to herein as coefficients. The parameters E and F represent translational offsets in vertical and horizontal directions. According to equation (1), the pixel value for a prediction block at pixel position (x, y) in the current block is taken from the pixel position ($x_{ref}$, $y_{ref}$) in the reference frame. Where the motion model is a translational motion vector (mvx, mvy), the following equations would apply.

$$x_{ref} = x + mvx \tag{2a}$$

$$y_{ref} = y + mvy \tag{2b}$$

The process 600 determines a motion vector for the current block at 604. At 604, the motion vector is a translational motion vector that is used for inter-prediction of the current block. The motion vector may be a motion vector determined and encoded into an encoded bitstream that is subsequently decoded by the decoder. In some implementations, the motion vector is a motion vector re-used from another block. In some implementations, the motion vector is differentially coded similarly to a block. That is, a reference motion vector is determined, and the difference between the determined motion vector and the reference motion vector is encoded for the decoder to later use for reconstruction of the determined motion vector. The decoder may determine the motion vector from header information for the block included in the encoded bitstream. The motion vector for inter-prediction of the current block may be referred to as a second translational motion vector. In FIG. 7B, the motion vector for the current block 702 is the translational motion vector 706.

At 606, a warp model is generated for the current block. The warp model may be a second warp model for the inter-prediction of the current block generated using the motion model used for inter-prediction of the adjacent block and the (e.g., second translational) motion vector for inter-prediction of the current block. The warp model for the current block may be constructed to extend the motion of the adjacent block into the current block. For the transition to be smooth, it is desirable that a continuity constraint be applied such that the per-pixel motion vectors, such as the per-pixel motion vectors 708 in FIG. 7B, are continuous across the boundary (edge, border, line, etc.) between the two blocks. More specifically, if the motion models of two adjacent blocks don't exactly line up at a border between them (e.g., the motion models are simple translations by different amounts), then the pixels on either side of the border can be predicted from very different places and can have very different values. In some cases, this is desirable, such as when the border matches an edge in the image, but otherwise the border pixels may need to be adjusted (e.g., using deblocking filters). Using the continuity constraint can select a motion model that makes the newly predicted block smoothly blend into the adjacent block's prediction, reducing or eliminating such adjustments.

Because the adjacent block 704 is to the left of the current block 702 in this example, both warp models should result in the same motion vector for the vertical line of pixels just to the left of the boundary between the blocks. Each point along the edge thus satisfies the following equation.

$$\begin{pmatrix} A & B \\ C & D \end{pmatrix}\begin{pmatrix} x \\ y \end{pmatrix} + \begin{pmatrix} E \\ F \end{pmatrix} = \begin{pmatrix} A' & B' \\ C' & D' \end{pmatrix}\begin{pmatrix} x \\ y \end{pmatrix} + \begin{pmatrix} E' \\ F' \end{pmatrix} \tag{3}$$

In equation (3), the parameters A, B, C, D, E, and F represent the first warp model (i.e., the warp model of the adjacent block), while the parameters A', B', C', D', E', and F' represent the second warp model (i.e., the warp model of the current block). If the continuity constraint is applied along a column of pixels with horizontal coordinate x, for example the column immediately to the left of the current block, then equation (3) is true for this single value of x but many values of y, one for each pixel along the edge. This means that the coefficients of y are the same on each side of the equality, as shown by the below equations.

$$B' = B \tag{4}$$

$$D' = D \tag{5}$$

Meanwhile, the coefficients of x satisfy the following equations. These equations equate the relationship of coefficients of x and translational parameters of the motion model to the relationship of coefficients of x and translational parameters of the second warp model.

$$A'x + E' = Ax + E \tag{6}$$

$$C'x + F' = Cx + F \tag{7}$$

Equations (4), (5), (6), and (7) are four equations with six unknowns (equivalent to two equations with four unknowns because B' and D' are known) and may be respectively referred to as first, second, third, and fourth equations. To solve for the parameters of the second warp model, the translational motion vector (mvx, mvy) determined at 604 may be used. For example, to generate the second warp model can include to modify the first warp model using the translational motion vector. The motion vector is specified at an additional point in the current block, which results in six equations in six variables. More specifically, while translational motion vectors are applied to all pixels in the block when they are the only motion model for a block, their origin (mathematically) may be specified as a single point within the block, here referred to as (x0, y0). In the examples herein, the pixel position (x0, y0) is the center of the block. In a coordinate system of the current block, where the top left-most pixel is at position (0,0) and the bottom right-most pixel is at (w−1, h−1), where w represents the width of the block (in pixels) and h represents the height of the block (in pixels), the center of the block is at position (w/2−1, h/2−1). The block may have dimensions of 4×4 pixels, 8×8 pixels, 8×16 pixels, etc. Establishing a common coordinate system for the motion model of the adjacent block and the translational motion vector is desirable. In an example, the values of x0 and y0 may be defined on a common coordinate system where x is the pixel coordinate (e.g., relative to the left edge of the frame) of the vertical line where continuity is to be maintained, and y is the vertical coordinate of respective pixels along the line. In the example described above where the continuity constraint is applied along the column immediately to the left of the current block, the location of the column is x=−1 such that the horizontal distance from the line to the block center is exactly w/2.

The two additional equations (e.g., fifth and sixth equations) using the translational motion vector for the current block are included below as equations (8) and (9). As can be seen from the below, the equations are developed by equating the predicted pixel position for the pixel position (x0, y0) that is obtained from the motion vector, e.g., according to equations (2a) and (2b), to the predicted pixel position from the second warp model of equation (3).

$$A'x0+B'y0+E'=x0+mvx \quad (8)$$

$$C'x0+D'y0+F'=y0+mvy \quad (9)$$

Substituting B' for B from equation (4) into equation (8) results in the following equation.

$$A'x0+By0+E'=x0+mvx \quad (10)$$

Solving equation (10) where x0=x+(x0−x) results in the following equation.

$$A'x+A'(x0-x)+By0+E'=x0+mvx \quad (11)$$

Regrouping equation (11) results in the following equation.

$$A'(x0-x)+By0+(A'x+E')=x0+mvx \quad (12)$$

Substituting equation (6) results in the following equation.

$$A'(x0-x)+By0+(Ax+E)=x0+mvx \quad (13)$$

Solving equation (13) for the only unknown variable, namely A', results in the following equation.

$$A'=[x0+mvx-(Ax+By0+E)]/(x0-x) \quad (14)$$

As mentioned briefly above, the values for x and x0 and the values for y and y0 depend upon the coordinate system used. For a relatively straightforward implementation, a common coordinate system may be used whereby the coordinate values for x and x0 are given relative to the left edge of the frame, and the coordinate values for y and y0 are given relative to the top edge of the frame (e.g., starting at 0). Where the pixel position (x0, y0) is at the center of the block on the common coordinate system, x0−x is half the width of the current block (w/2), which is generally a power of 2. This simplifies the calculations, particularly the division. That is, the use of this convention allows the division to be performed using a binary right shift operation, which is much simpler than a division on a digital computer.

Similar calculations may be used to determine the value for C' from equation (9). Namely, substituting D' for D from equation (5) into equation (9) results in the following equation.

$$C'x0+Dy0+F'=y0+mvy \quad (15)$$

Solving equation (15) where y0=y+(y0−y) results in the following equation.

$$C'x+C'(y0-y)+Dy0+F'=y0+mvy \quad (16)$$

Regrouping equation (16) results in the following equation.

$$C'(y0-y)+Dy0+(C'x+F')=y0+mvy \quad (17)$$

Substituting equation (7) results in the following equation.

$$C'(x0-x)+Dy0+(Cx+F)=y0+mvy \quad (18)$$

Solving equation (18) for the only unknown variable, namely C', results in the following equation.

$$C'=[y0+mvy-(Cx+Dy0+F)]/(y0-y) \quad (19)$$

Thereafter, equations (6) and (7) may be rearranged to solve for E' and F' as follows.

$$E'=Ax+E-A'x \quad (20)$$

$$F'=Cx+F-C'x \quad (21)$$

The above is one technique to solve for the parameters of the warp model for the current block, which generates the second warp model. Others are possible, as are variations in the sequence of calculations. Moreover, the equations above are used to explain the solution for easy understanding. The computations may differ from those described so long as a solution for the parameters of the second warp model is obtained from the motion model of the adjacent block and the translational motion vector of the current block.

For example, generating the warp model for the current block at 606 can include generating the warp model using a (e.g., first) translational motion vector of the adjacent block and the second translational motion vector. That is, another implementation of generating the warp model at 606 can include a condition where the motion model for the adjacent block, such as the adjacent block 704, is a translational motion vector. To generate the warp model for the current block, such as the current block 702, the translational motion vector of the adjacent block may be considered a special case of a warp model where the non-translational part of the model is the identity matrix. That is, the solution for the parameters of the second warp model can assume that the non-translational parameters of a warp model are A=1, B=0, C=0, D=1, while the translational parameters of the adjacent block correspond to the translational motion vector, i.e., $E=mvx_A$ and $F=mvy_A$, where the motion vector for the adjacent block is $(mvx_A, mvy_A)$.

After generating the warp model for the current block at 606, the (second) warp model may be used to perform an inter-prediction process for the current block at 608. For example, the second warp model could be used to generate a prediction block for the current block at a prediction stage of the decoder, such as the intra/inter prediction stage 508 of the decoder 500. Thereafter, the prediction block is added to the residual for the current block to reconstruct the current block, such as at the reconstruction stage 510 of the decoder 500. The residual is decoded from the encoded bitstream by, in some examples, entropy decoding, dequantization, and inverse transformation as described with regards to the decoder 500.

The process 600 described above can be repeated for any block encoded using local motion extension. At the decoder, reconstructed blocks, the reconstructed frame, or both may be filtered using an in-loop filter, post-loop filtering, or both.

As mentioned briefly above, the method or process 600 for inter-predicting a current block using a warp model generated using local motion extension may be performed at the encoder or decoder. An implementation of the process 600 at the decoder is described above. Next described is an implementation of the process 600 at the encoder for encoding a current block.

At 602, the motion model for an adjacent block is determined. The adjacent block shares at least a portion of a boundary with the current block. The motion model is a (e.g., first) translational motion vector or a (e.g., first) warp model used for inter-prediction of the adjacent block. The adjacent block is a previously encoded neighboring block that has been reconstructed. When encoding and decoding occurs in raster scan order, the adjacent block may be a block above or to the left of the current block. In other implementations or scan orders, the adjacent block may be below or to the right of the current block. This implementation first discusses a condition where only one adjacent block has a motion model (i.e., other adjacent blocks are intra predicted. Implementations described hereinbelow address conditions where more than one adjacent block is available.

The process 600 determines a motion vector for the current block at 604. At 604, the motion vector is a translational motion vector that is used for inter-prediction of the current block. The motion vector may be a motion vector determined by conventional techniques such as a motion search within one or more reference frames for the best matching reference block among reference blocks found within respective reference frames, e.g., in the intra/inter prediction stage 402 of the encoder 400. This may be implemented in a rate-distortion loop at the encoder. If the best prediction mode for the current block is instead an intra prediction mode, the process 600 may end for the current block. In some implementations, a search for the prediction mode for the current block may determine the prediction mode as a compound prediction mode, e.g., one that generates a prediction block using at least two prediction modes.

At 606, a warp model is generated for the current block. The warp model may be a second warp model for the inter-prediction of the current block generated using the motion model used for inter-prediction of the adjacent block and the (e.g., second translational) motion vector for inter-prediction of the current block. According to the example above, the warp model for the current block is generated using a warp model of the adjacent block and a translational motion vector of the current block, such as the warp model of the adjacent block 704 shown by the arrows in FIG. 7A and the motion vector 706 of the current block 702 in FIG. 7B. For example, to generate the warp model for the current block can include to modify the warp model of the adjacent block using the translational motion vector. Another example described above is the implementation where the motion model for the adjacent block, such as the adjacent block 704, is a translational motion vector.

After generating the warp model for the current block at 606, the encoder may use the warp model to perform an inter-prediction process for the current block at 608. For example, the warp model can be used to generate a prediction block for the current block at a prediction stage of the encoder, such as the intra/inter prediction stage 402 of the encoder 400. Thereafter, the prediction block is subtracted from the current block to generate a residual for encoding into an encoded bitstream, such as by transformation, quantization, and entropy coding. The warp model, and the resulting prediction block, may also be used in a rate-distortion loop to determine whether the local motion extension as described herein provides a better predictor than the inter-prediction mode.

Further, and although the description above states that the process 600 may end if the best prediction mode is an intra-prediction mode at 604, this is not required. The best inter-prediction mode for the current block determined at 604 (e.g., in a rate-distortion loop) may be used together with the motion model determined at 602 to generate the warp model for the current block at 606. The better prediction mode of the intra-prediction mode and the local motion extension mode (e.g., which of the prediction block by the intra-prediction mode or using the warp model determined at 608 results in a lower bit cost, a higher quality, or both, for encoding the current block) may then be selected as the prediction mode for the current block.

However, if the encoder determines that the warp model is to be used as the predictor for the current block after the process 600 ends, the decoder must also know to generate the warp model. In some implementations, the encoder may indicate on a frame-level basis whether location motion extension is an available coding tool (also called a prediction mode herein). For example, the encoder may transmit a flag within a header for a frame where one or more blocks is encoded using a warp model generated using local motion extension. Alternatively, the encoder may omit a frame-level signal. Whether the encoder transmits a frame-level signal or flag or does not do so, a per-block signal may be transmitted to indicate which blocks were encoded using a warp model generated using local motion extension. The signal may be a flag encoded into the header of a block such as the current block.

In some implementations, signaling on a per-block basis may not be done. The encoder, for example, may conform to a set of rules that a bitstream-compliant decoder may also use to infer whether the current block uses local motion extension from the surrounding context. One example of the surrounding context may be the number of adjacent blocks coded using a warp model. If a defined number of adjacent blocks use a warp model, the current block may also use a warp model. Another example of the surrounding context may be the number of adjacent blocks coded using a translational motion vector as compared to an intra-prediction mode. If a defined number of adjacent blocks use different translational motion vectors, the current block may use a warp model. Another example of the surrounding context may be the number of adjacent blocks using the same reference frame for motion prediction as the current block. If a defined number of adjacent blocks use the same reference frame, the current block may use a warp model. Some combination of two or more of these contexts, or other contexts, may be used.

The motion vector of the current block may be encoded into the encoded bitstream for use by a decoder using any known technique. For example, the encoder may signal that the motion vector is a motion vector re-used from another block. In some implementations, the encoder may differentially encode the motion vector by determining a reference motion vector and encoding a difference between the determined motion vector and the reference motion vector. The encoder may encode signals (flags, bits, etc.) into the header regarding how the motion vector is encoded, what motion vector is used, what reference motion vector is used, or some combination thereof. In an example implementation, a dynamic reference list may be maintained that prioritizes adjacent (or neighboring) blocks based on defined criteria, and the encoder may signal from which of the blocks the reference motion vector may be obtained. The decoder generates a similar dynamic reference list using the same criteria and decodes the signal to determine the reference motion vector in this latter implementation.

If there is only one adjacent block or only one adjacent block that is encoded using inter-prediction (e.g., using a motion vector or warp model), the encoder does not need to signal which adjacent block to use for generating the warp model for the current block. If there are multiple adjacent blocks, then identifying which is selected may be signaled expressly within the bitstream. In an implementation, each adjacent block available for local motion extension may be numbered, and the encoder can signal an index to specify which adjacent block to use. In another implementation, the dynamic reference list described above and used to identify the reference motion vector for the adjacent block, the current block, or both, may be used to identify the adjacent block for the local motion extension. Even when there exists more than one adjacent block, express signaling may not be required. As explained above, the decoder may determine the adjacent block from context such that the encoder does not need to send an identifier.

The above description applies to extend the motion of only one adjacent block into the current block, but the teachings herein are not so limited. More complicated motion may be captured by generating respective prediction blocks using two or more warp models developed from respective adjacent blocks and a motion vector of the current block, and then combining the prediction blocks into a single prediction block. The combining may be performed using averaging, weighted averaging (e.g., based on the pixel position relative to an edge), etc. This variation uses the same motion vector of the current block to generate each warp model.

It is possible that the encoder determines that the (e.g., initial) prediction mode for a current block is a compound prediction mode. In an implementation of a compound prediction mode, namely a bidirectional prediction mode, two motion vectors may be determined for the current block. A respective warp model may be determined using the motion model of the adjacent block and each motion vector of the current block. The prediction blocks resulting from each warp model may be combined using averaging, weighted averaging etc., to obtain a single prediction block for the current block.

In another implementation of a compound prediction mode, the encoder may determine that different portions of the current block should be predicted differently. For example, one portion of the current block may be associated with a translational motion vector, while another portion is associated with an intra-prediction mode. The generation and use of the warp model may be limited to pixels of the portion of the current block associated with the translational motion vector. In another example, one portion of the current block may be associated with a translational motion vector, while another portion of the current block is associated with a different translational motion vector. In this example, a respective warp model may be generated using each of the translational motion vectors and the prediction blocks may be combined as previously described. Alternatively, a warp model may be generated for each portion of the current frame using a motion model of a neighboring block adjacent to pixels of that portion and the associated translational motion vector. The neighboring block may be a single adjacent block or different adjacent blocks. The predicted blocks may be limited to the dimensions of the respective portions and joined along the same border as the portions to form a single prediction block for the current block.

In the examples herein, the warp model is generated, derived, or otherwise created where the neighboring block is to the left of the current block to be encoded or decoded. The continuity condition is maintained so that the same motion vector results for the vertical line of pixels just to the left of the boundary between the blocks. This condition changes if the adjacent block is located to the right of the current block, above the current block, or below the current block. For example, if the adjacent block is above the current block, the equations may be similarly derived in consideration of the conditions that the points (pixels) along the edge or boundary between the blocks have different values for x but all the same value for y.

In the examples herein, the current block and the adjacent block have the same size. Implementations of the teachings herein can also generate a warp model for the current block where the block sizes are different. If the adjacent block has a larger dimension (e.g., length or height in pixels) than the current block along the boundary, the generation of the warp model described above at 606 is unchanged. If the adjacent block has a smaller dimension (e.g., length or height in pixels) than the current block along the boundary, the generation of the warp model described above at 606 is limited to those pixels that lie on the shared (common, coincident, etc.) boundary.

A warp model from an adjacent block may be used to predict the warp model for the current block. One way to do this is to use the warp model of the adjacent block to predict a motion vector at a specific point (or more than one point) of the current block. The motion vector(s) of the current block may be signaled as a respective offset from a predicted motion vector. If the motion vector(s) of the current block match the predicted motion vector(s) from the adjacent block's warp model, then the warp model for the current block determined by the techniques described herein will be unchanged from the warp model of the adjacent block. In this situation, it may be desirable to directly signal that the warp model of the adjacent block should be re-used without adaptation, rather than performing the complete process 600, as this would give the same result for the current block.

The techniques herein describe the generation of a local warp model using local motion extension. The local warp model may be used for inter-prediction of a block. The techniques represent an improvement over fitting a model to motion vectors of nearby blocks using least squares. First, the techniques use continuity of motion between adjacent blocks. This reduces sharp edges between blocks, which may reduce the need for a deblocking filter and/or reduce the number of bits needed to signal a deblocking filter. Further, the techniques are significantly less computationally intensive compared to a full least-squares solution. Only a relatively small number of basic arithmetic operations may be required. The techniques do not just copy the warp model between blocks. Instead, the techniques allow the warp model of an adjacent block to be adapted in a relatively cheap-to-signal way. Greater flexibility in modeling complex motion results.

For simplicity of explanation, the processes herein are depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers (e.g., an apparatus), intellectual property (IP) cores, application-specific integrated circuits (ASICs), programmable logic arrays, optical processors, programmable logic controllers, microcode, microcontrollers, servers, microprocessors, digital signal processors or any other suitable circuit (e.g., as a processor of an apparatus). In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms and/or instructions described herein. In addition, or alternatively, for example, a special purpose computer/processor can be utilized that contains other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. An apparatus, comprising:

a processor configured to:

determine a motion model used for inter-prediction of an adjacent block that shares at least a portion of a boundary with a current block to be predicted;

determine a translational motion vector for inter-prediction of the current block;

generate a warp model for the inter-prediction of the current block using the motion model and the translational motion vector, wherein the warp model is generated according to a constraint applied along a column of pixels of the adjacent block along the at least the portion of the boundary to maintain per-pixel motion vector continuity across the at least the portion of the boundary; and perform an inter-prediction process for the current block using the warp model.

2. The apparatus of claim 1, wherein the motion model is one of a first translational motion vector or a first warp model.

3. The apparatus of claim 1, wherein to generate the warp model comprises to:

maintain, according to the constraint, a continuity of motion of pixels across the at least the portion of the boundary.

4. The apparatus of claim 3, wherein the continuity of motion exists when per-pixel motion vectors of the adjacent block are continuous across the at least the portion of the boundary.

5. The apparatus of claim 1, wherein to generate the warp model comprises to:

establish a common coordinate system for the motion model and the translational motion vector; and solve for parameters of the warp model using the common coordinate system.

6. The apparatus of claim 1, wherein to generate the warp model comprises to:

solve for parameters of the warp model using the motion model and second translational motion vector.

7. The apparatus of claim 1, wherein to perform an inter-prediction process for the current block comprises to:

determine a prediction block for the current block using the warp model and a reference frame;

generate a residual block comprising a difference between pixels of the current block and pixels of the prediction block; and encode the residual into an encoded bitstream.

8. The apparatus of claim 1, wherein to perform an inter-prediction process for the current block comprises to:

determine a prediction block for the current block using the warp model and a reference frame;

decode a residual block from an encoded bitstream; and reconstruct the current block by adding pixels of the residual block to pixels of the prediction block.

9. The apparatus of claim 1, wherein the warp model comprises a six-parameter equation representing at least one of rotation, scaling, shearing, or stretching.

10. The apparatus of claim 1, wherein the boundary comprises a vertical line between the adjacent block and the current block, the vertical line has a horizontal coordinate x and multiple values for a vertical coordinate y, and to generate the warp model comprises to:

generate a first equation that equates a first coefficient of the vertical coordinate y of the motion model to a first coefficient of the vertical coordinate y of the warp model;

generate a second equation that equates a second coefficient of the vertical coordinate y of the motion model to a second coefficient of the vertical coordinate y of the warp model;

generate a third equation that equates a first coefficient of the horizontal coordinate x and a first translational parameter of the motion model to a first coefficient of the horizontal coordinate x and a first translational parameter of the warp model;

generate a fourth equation that equates a second coefficient of the horizontal coordinate x and a second translational parameter of the motion model to a second coefficient of the horizontal coordinate x and a second translational parameter of the warp model;

generate, using a defined pixel position in the current block, a fifth equation that equates a predicted horizontal pixel coordinate obtained using the translational motion vector to a predicted horizontal pixel coordinate obtained using the warp model;

generate, using the defined pixel position in the current block, a sixth equation that equates a predicted vertical pixel coordinate obtained using the translational motion vector to a predicted vertical pixel coordinate obtained using the warp model; and solve the first equation, the second equation, the third equation, the fourth equation, the fifth equation, and the sixth equation to obtain the first coefficient of the vertical coordinate y of the warp model, the second coefficient of the vertical coordinate y of the warp model, the first coefficient of the horizontal coordinate x of the warp model, the first translational parameter of the warp model, the second coefficient of the horizontal coordinate x of the warp model, and the second translational parameter of the warp model.

11. The apparatus of claim 1, wherein the motion model comprises a first warp model and to generate the warp model comprises to modify the first warp model using the translational motion vector.

12. The apparatus of claim 1, wherein the motion model comprises a first translational motion vector and to generate the warp model comprises to:

determine a six-parameter warp model using the first translational motion vector; and modify the six-parameter warp model using the translational motion vector.

13. A method, comprising:

determining a motion model used for inter-prediction of an adjacent block that shares at least a portion of a boundary with a current block to be predicted;

determining a translational motion vector for inter-prediction of the current block;

generating, according to a constraint applied along a column of pixels of the adjacent block along the at least the portion of the boundary to maintain per-pixel motion vector continuity across the at least the portion of the boundary, a warp model for the inter-prediction of the current block using the motion model and the translational motion vector; and performing an inter-prediction process for the current block using the warp model.

14. The method of claim 13, wherein the motion model is one of a first translational motion vector or a first warp model.

15. The method of claim 13, wherein generating the warp model comprises:

maintaining a continuity of motion of pixels across the boundary.

16. The method of claim 15, wherein the continuity of motion exists when per-pixel motion vectors of the adjacent block are continuous across the at least the portion of the boundary.

17. The method of claim 13, wherein:

a prediction mode for the current block comprises a compound prediction mode;

the method comprises:

determining an other translational motion vector for the inter-prediction of the current block; and generating an other warp model for the inter-prediction of the current block using the motion model and the other translational motion vector; and performing the inter-prediction process for the current block comprises performing the inter-prediction process using the warp model and the other warp model.

18. The method of claim 13, wherein:

a prediction mode for the current block comprises a compound prediction mode having a first portion of the current block predicted using intra-prediction and a second portion of the current block predicted using the translational motion vector; and performing the inter-prediction process for the current block comprises performing the inter-prediction process for only the second portion of the current block using the warp model.

19. A non-transitory, computer-readable medium storing an encoded bitstream, wherein the encoded bitstream comprises compressed residual block data corresponding to a current block of a frame encoded using a warp model, a motion model used for inter-prediction of an adjacent block that shares at least a portion of a boundary with the current block within the frame, and a translational motion vector for inter-prediction of the current block, wherein the warp model used for the inter-prediction of the current block is generated using the motion model and the translational motion vector and according to a constraint applied along a column of pixels of the adjacent block along the at least the portion of the boundary to maintain per-pixel motion vector continuity across the at least the portion of the boundary, wherein the non-transitory, computer-readable medium further stores instructions to configure a decoder to decode the encoded bitstream.

20. The non-transitory, computer-readable medium of claim 19, wherein the encoded bitstream comprises the compressed residual block data corresponding to the current block of the frame encoded using the warp model and an other warp model, an other translational motion vector for the inter-prediction of the current block, and the other warp model used for the inter-prediction of the current block is generated using the motion model and the other translational motion vector.

* * * * *